UNITED STATES PATENT OFFICE.

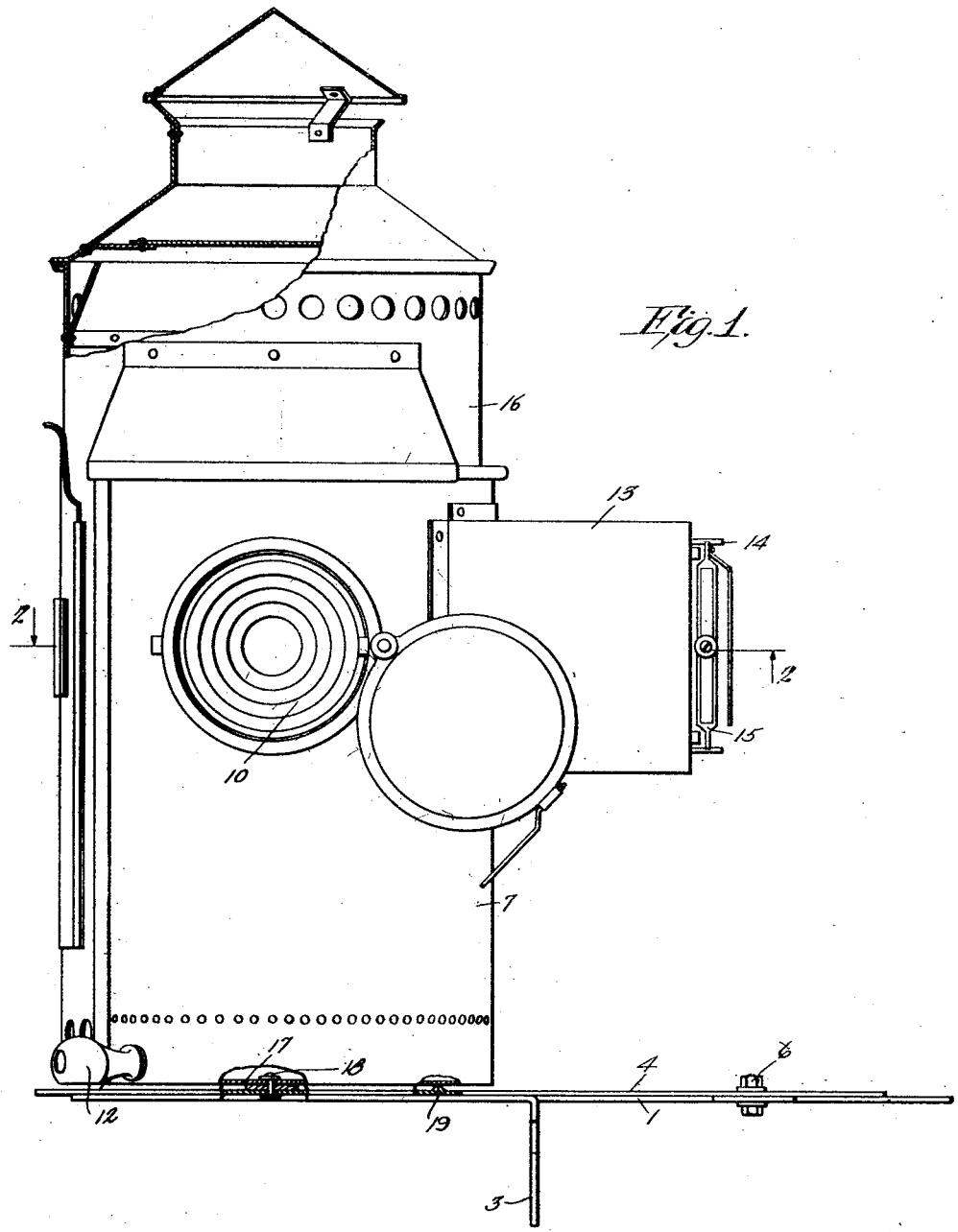

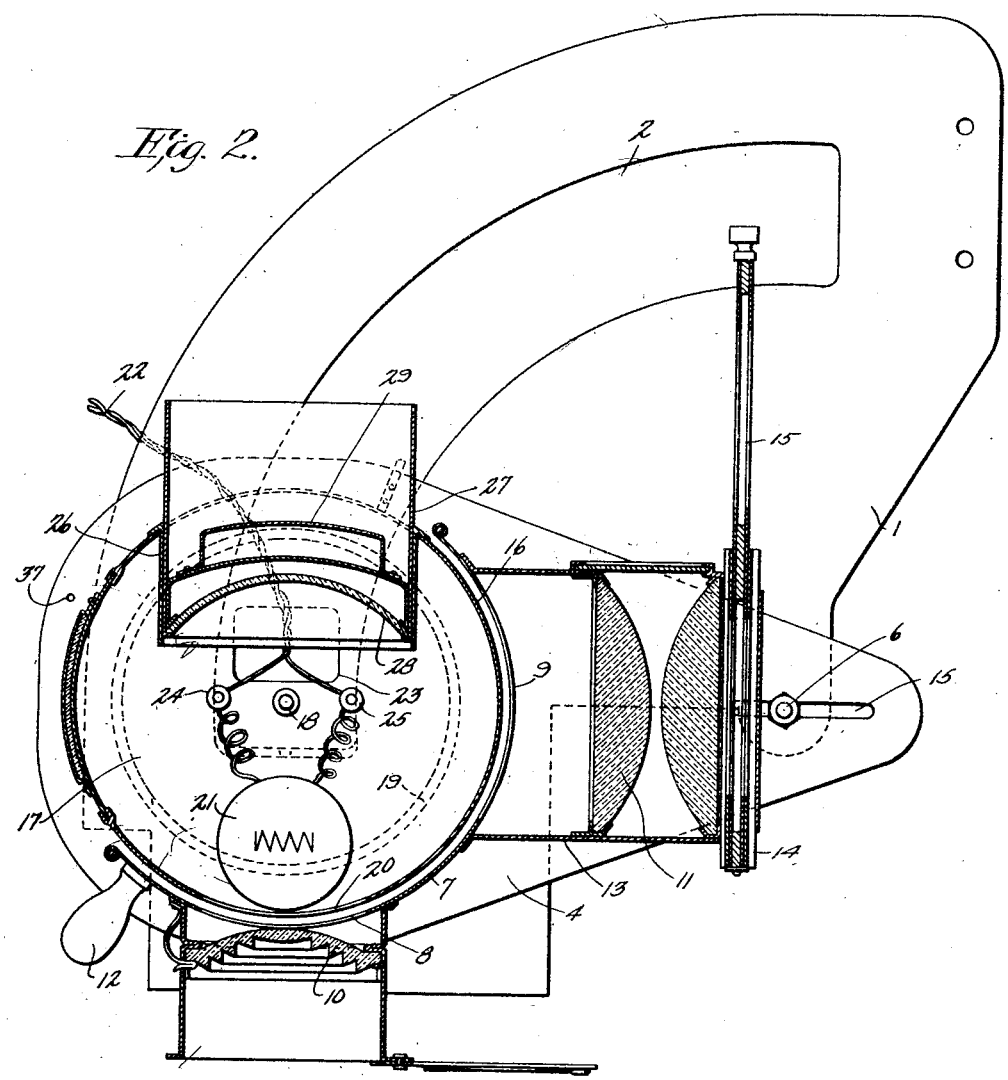

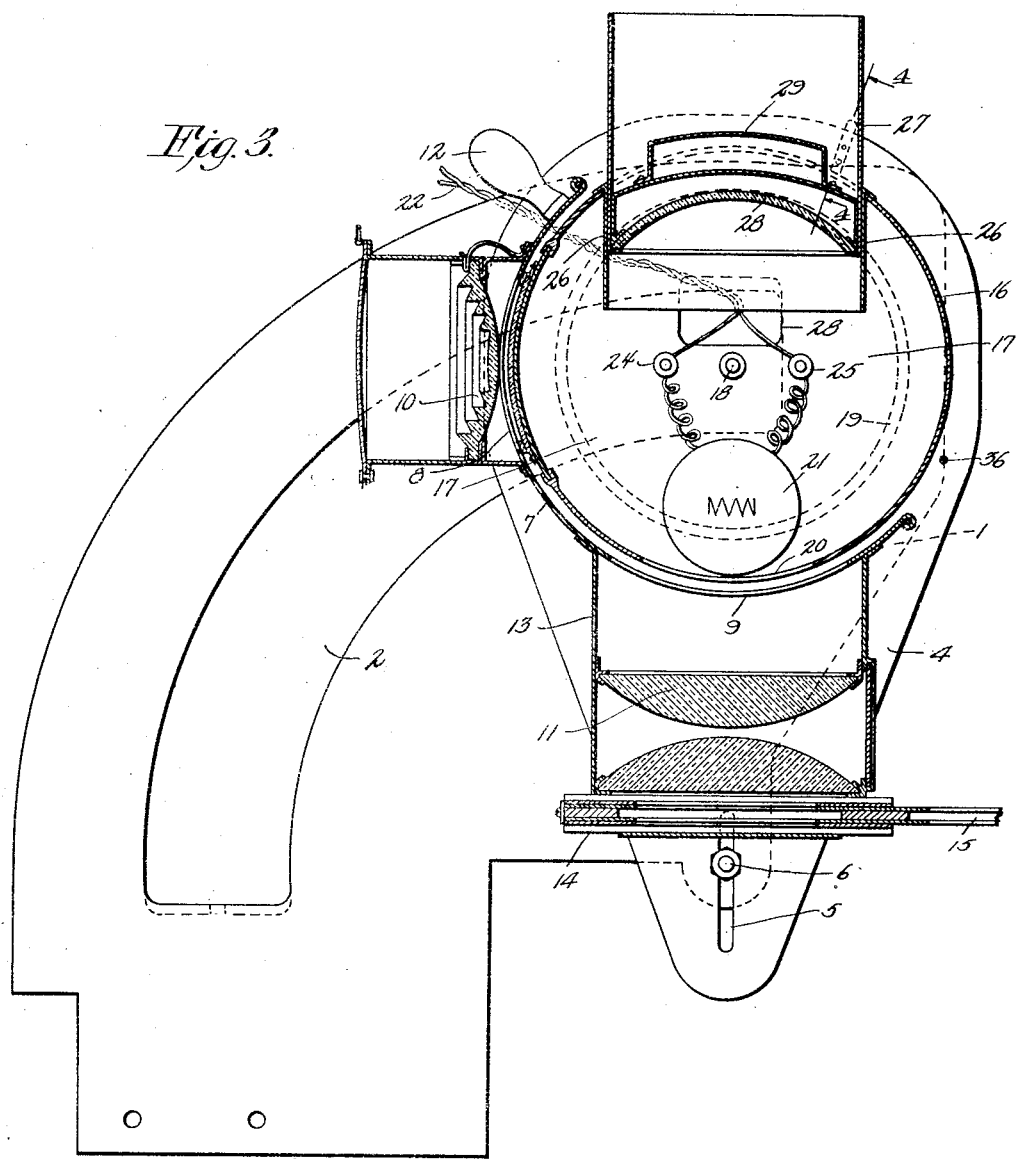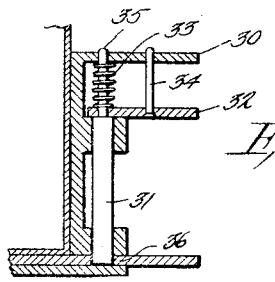

ALVIN G. HAMMELL, SR., OF NEW YORK, N. Y.

LANTERN-CARRIAGE AND LENS-MOUNT.

1,364,753.  Specification of Letters Patent.  Patented Jan. 4, 1921.

Application filed March 9, 1920. Serial No. 364,412.

*To all whom it may concern:*

Be it known that I, ALVIN G. HAMMELL, Sr., a citizen of the United States, and a resident of the city of New York, borough of the Bronx, in the county of Bronx and State of New York, have invented new and useful Lantern-Carriages and Lens-Mounts, of which the following is a full, clear, and exact description.

This invention relates to a carriage for a lantern and for lenses wherein the parts are so positioned and arranged that by suitable shifting the same light may be used with the proper lens for a moving picture projector or for a stereopticon.

Another object of the invention is to provide a carriage arranged to swing from one position to another and shift automatically the lamp carried by the carriage from near one lens to another in order to quickly adapt the device to a stereopticon or a moving picture machine without complicated adjustments.

A still further object of the invention is to provide a combined lens mount and carriage designed to support a moving picture lens and a stereopticon lens, the arrangement being such that the carriage may be swung from one position to another for using either lens, and the lantern independently rotated to produce a proper light at the proper place.

An additional object is to provide a construction which will permit the use of a single lamp for a moving picture machine and for a stereopticon, and which will cause the lamp too be properly positioned for other purposes without an adjustment except the swinging from one position to the other along a prepared and predetermined course.

In the accompanying drawings:

Figure 1 is a front view of a device embodying the invention.

Fig. 2 is a horizontal section through Fig. 1 on line 2—2.

Fig. 3 is a sectional view similar to Fig. 2, but showing the parts shifted so that a stereopticon is in use.

Fig. 4 is a detail fragmentary sectional view through Fig. 3 on line 4—4, the same being on an enlarged scale.

Referring to the accompanying drawings by numerals 1 indicates a base or foundation of any kind, preferably of metal, the same being provided with an arc-shaped opening 2, and also with one or more flanges 3 whereby the base may be secured to a moving picture machine support, or to any other desired support adjacent the moving picture machine. Arranged on the base 1 is a swinging adjusting plate 4 provided with a slot 5 through which the bolt 6 extends, said bolt also extending through part of the plate 1. This arrangement is such that the parts may be swung from the position shown in Fig. 2 to that shown in Fig. 3, and also plate 4 shifted back and forth in respect to the bolt 6 to accommodate the light to the window opening in the booth, or for any other purpose desired. Mounted rigidly on the plate 4 is a stationary casing 7 which is provided with light openings 8 and 9 arranged in alinement with the moving picture lens 10 and the stereopticon lens 11. Casing 7 is approximately only semi-cylindrical and is provided with an operating knob 12, whereby the casing and the plate 4 and associate parts may be shifted over the base 1. Connected with the casing 7 is a stereopticon structure 13 which is provided with a lens 11, a slide guide 14 and suitable connecting members for accommodating the slide holder 15. The detail construction of this stereopticon feature forms no part of the present invention, as any suitable form may be used, but the position or arrangement of the same opposite the opening 9 is of importance, and forms part of the combination with the lens 10 and associate parts.

Arranged within the casing 9 is a rotatable lantern casing 16, which is provided with a bottom 17 held in place by a suitable pivotal pin 18, said pin extending through the bottom and through the plate 4. Plate 4 is provided with an annular pressed out portion 19 acting as a track so as to permit an easy rotation of the lantern casing 16. The rotary casing 16 is provided with a single light opening 20, which is arranged opposite the lamp 21, said lamp being preferably positioned very close to this opening so as to be near the moving picture lens 10 when the parts are in the position shown in Fig. 2, though the lamp is spaced an appreciable distance from the lens 11 when the parts are adjusted as shown in Fig. 3 for use as a stereopticon. The lamp 21 may be any desired kind, as for instance an incandescent lamp, and may be mounted on the bottom plate 17 in any way, as for instance by being stationary, or adjustable up and down and laterally. The current supply wires 22 preferably extend beneath the upper part of base 1 through the opening 2 and through a suitable opening 23 in the bottom plate 17 to the binding posts 24 and 25, from which binding posts suitable wires lead to the lamp 21.

Arranged on the opposite side to the opening 20 and in alinement therewith is a guiding sleeve 26, which is preferably permanently fixed to the casing 16, and is designed to slidingly receive the reflector carrying tube 27. The reflector 28 may be mounted on the tube 27 in any desired manner, and said tube may be actuated in any desired manner, as for instance by a suitable handle 29 connected to the tube 27 by rivets or otherwise. When the parts are in the position shown in Fig. 2 the handle 29 is grasped and the reflector 28 moved toward or from lamp 21 until a proper beam of light is secured for a moving picture machine. A similar adjustment is provided when the parts are in the position shown in Fig. 3 and the device is being used as a stereopticon.

In moving picture theaters it is customary to use a stereopticon for projecting separate stationary pictures or information of different kinds on the screen; to do this a stereopticon of some kind must be used and the moving picture apparatus shut off. Various devices have been provided for accomplishing this result, but said devices usually require a large amount of adjustment and focusing before desirable results are secured. By the present construction of rotatable lantern casing 16 carrying lamp 21 and the other parts, means are provided which will act efficiently with a moving picture machine when the parts are arranged as shown in Fig. 2, and will act efficiently as a stereopticon when the parts are arranged as shown in Fig. 3. The parts may be quickly, in fact almost instantly, changed from the position shown in Fig. 2 to that shown in Fig. 3, the movement being caused by the operator grasping handle 12 and moving the parts quickly to the new position. The lantern casing 16 may be turned during this swinging movement or may be turned later to a proper alinement with the lens 11. In order that the adjustment of the parts may be done quickly and accurately, a catch 30 is secured to the casing 16 in any desired manner, said catch including a reciprocating bolt 31, a bolt moving member 32, a spring 33, and guides 34 and 35, the last mentioned guide being preferably part of the bolt 31. The operator on shifting the lantern will first press upwardly on the member 32 for raising the bolt 31 out of the aperture 36 in plate 4, then move the parts to the new position as shown in Fig. 3 and allow bolt 31 to move downwardly into the aperture 37. The apertures 36 and 37 are so positioned that they will automatically lock the parts in two adjusted positions so that the lamp 21 will be alined properly with the lens 10 and the moving picture apparatus, or alined properly with the stereopticon lens 11 and the opening in the booth.

What I claim is:

1. A lantern carriage and lens mount comprising a casing provided with a moving picture lens and a stereopticon lens, said lenses being arranged at approximately a 90° angle from each other, a swinging plate for carrying said casing, a rotatable lamp arranged in said casing, and a reflector rotatable with the lamp whereby the parts may be quickly moved to cause the lamp to project the light through either of said lenses on the same screen.

2. In a device of the character described, a supporting plate, a plate pivotally mounted on the supporting plate so as to swing in a horizontal plane through approximately 90°, two sets of lenses arranged on said swinging plate, said lenses being arranged at approximately 90° from each other, and a single lamp carried by said plate for providing a beam of light for both sets of lenses.

3. In a device of the character described a swinging carriage, a pair of lenses carried by said carriage and adapted to be moved with the carriage so that either lens may be caused to face a given screen, a single lamp carried by said carriage, and means for causing said lamp to be positioned to project a beam of light through either of said lenses when the same are facing said screen.

4. In a device of the character described, a support, a plate pivotally mounted on the support so as to swing in a horizontal plane, a moving picture machine lens carried by said swinging plate, a stereopticon lens carried by said swinging plate arranged at an appreciable angle from the moving picture machine lens, a rotatable lantern casing carried by said plate, and a lamp carried by said casing positioned to be shifted by the casing so as to project through either of said lenses.

5. A carriage for projecting machines comprising a plate adapted to swing in a horizontal plane, means for mounting a moving picture lens on said plate, means for mounting a stereopticon lens on the plate at an angle to the moving picture lens, and a movable lamp arranged on said plate capable of movement opposite either of said lenses when facing a certain direction.

6. A carriage for moving picture machines comprising a horizontal swinging plate, a moving picture lens carried by said plate, a stereopticon lens carried by said plate at an angle to said moving picture lens, said plate being moved so that the moving picture lens will be opposite the moving picture mechanism when in one position and the stereopticon lens will be placed in a direction substantially parallel to the moving picture machine when moved to a second position, a single lamp carried by said swinging plate, and means for shifting the lamp so as to project rays of light through either of said lenses when in the correct position.

7. In a device of the character described, a base plate having an arc-shaped opening therein, a swinging plate mounted on said base plate, means for pivotally connecting the base plate with the swinging plate so that the swinging plate may move in a horizontal plane through approximately a 90° movement, a casing mounted on the swinging plate provided with openings at substantially 90° apart, a moving picture lens arranged in front of one of said openings, a stereopticon lens arranged in front of the other of said openings, a rotatable lantern casing mounted on said swinging plate formed with a single opening adapted to be brought at different times in alinement with the openings in said first mentioned casing, a lamp carried by said lantern casing, said lamp being positioned adjacent the opening in the lantern casing whereby when the lantern casing is shifted from one opening to the other light will be projected through the respective lenses, and means for swinging said swinging plate so as to cause both of said lenses to project a beam of light on the same screen.

8. In a device of the character described, a base plate adapted to be secured to a support, a swinging plate pivotally mounted in said base plate adapted to swing in a horizontal plane, means for mounting a moving picture and a stereopticon lens on said swinging plate, said respective lenses being at a 90° angle to each other, means for swinging said swinging plate and said lenses through an arc of approximately 90° so as to cause either of said lenses to face a given screen, and a movable lamp carried by the swinging plate positioned to be shifted in back of either of said lenses so as to project a light therethrough when facing said screen.

9. In a device of the character described, a swinging plate, two sets of lenses carried by said plate, means for swinging the plate so that either of said lenses may face a given screen, a rotatable lantern having a single opening mounted on said swinging plate and positioned so that said opening may be brought opposite either of said lenses when facing said screen.

10. In a device of the character described a swinging plate, two sets of lenses carried by said plate, one lens acting as a moving picture lens and the other as a stereopticon lens, means for swinging said plate so that either of said lenses may face a given screen and a lantern mounted on said swinging plate positioned to project a beam of light on said screen and through the lens facing the screen.

ALVIN G. HAMMELL, Sr.